United States Patent
Gray et al.

(10) Patent No.: US 10,011,043 B2
(45) Date of Patent: Jul. 3, 2018

(54) METHOD OF PRODUCING AN INTERNAL CAVITY IN A CERAMIC MATRIX COMPOSITE

(71) Applicant: General Electric Company, Schenectady, NY (US)

(72) Inventors: Paul Edward Gray, North East, MD (US); Herbert Chidsey Roberts, III, Simpsonville, SC (US); Glenn Curtis Taxacher, Simpsonville, SC (US); Sheena Kum Foster Walker, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 179 days.

(21) Appl. No.: 13/780,584

(22) Filed: Feb. 28, 2013

(65) Prior Publication Data

US 2013/0285296 A1  Oct. 31, 2013

Related U.S. Application Data

(60) Provisional application No. 61/639,617, filed on Apr. 27, 2012.

(51) Int. Cl.
| | |
|---|---|
| *B28B 7/34* | (2006.01) |
| *C04B 35/573* | (2006.01) |
| *C04B 35/80* | (2006.01) |
| *F01D 5/18* | (2006.01) |
| *F01D 5/28* | (2006.01) |

(52) U.S. Cl.
CPC ............ *B28B 7/342* (2013.01); *C04B 35/573* (2013.01); *C04B 35/806* (2013.01); *C04B 2235/6028* (2013.01); *F01D 5/187* (2013.01); *F01D 5/282* (2013.01); *F01D 5/284* (2013.01); *F05D 2300/6033* (2013.01)

(58) Field of Classification Search
CPC .......................... B28B 1/42; C04B 2235/6028
USPC ........................................................ 264/610
See application file for complete search history.

(56) References Cited

U.S. PATENT DOCUMENTS 3,907,949 A * 9/1975 Carlson .............................. 264/6
4,615,855 A * 10/1986 Orlowski et al. ............. 264/221
(Continued)

FOREIGN PATENT DOCUMENTS

| CN | 1131590 A | 9/1996 |
|---|---|---|
| CN | 101224497 A | 7/2008 |

(Continued)

OTHER PUBLICATIONS

EP Search Report and Opinion dated Sep. 10, 2013 from corresponding EP Appiication No. 13165242.2.
(Continued)

*Primary Examiner* — Nahida Sultana
(74) *Attorney, Agent, or Firm* — General Electric Company; Brian Overbeck

(57) ABSTRACT

A process for producing an internal cavity in a CMC article and mandrels used therewith. The process entails incorporating a mandrel made of a fusible material that is melted and drained during a thermal treatment of a CMC preform to form the CMC article. The mandrel material is preferably non-wetting and non-reactive with any constituents of the CMC preform during the thermal treatment. The mandrel is preferably tin or an alloy of tin.

19 Claims, 1 Drawing Sheet

(56) References Cited

U.S. PATENT DOCUMENTS

| | | | |
|---|---|---|---|
| 5,015,540 A | 5/1991 | Borom et al. | |
| 5,066,454 A * | 11/1991 | Hanson | 419/42 |
| 5,177,039 A * | 1/1993 | Allaire | C03B 19/06 |
| | | | 264/122 |
| 5,330,854 A | 7/1994 | Singh et al. | |
| 5,336,350 A | 8/1994 | Singh | |
| 5,628,938 A | 5/1997 | Sangeeta et al. | |
| 5,910,095 A * | 6/1999 | Strasser | C04B 35/80 |
| | | | 264/86 |
| 6,001,436 A | 12/1999 | Strasser et al. | |
| 6,024,898 A | 2/2000 | Steibel et al. | |
| 6,258,737 B1 | 7/2001 | Steibel et al. | |
| 6,280,550 B1 | 8/2001 | Steibel et al. | |
| 6,328,834 B1 | 12/2001 | Rebstock et al. | |
| 6,403,158 B1 * | 6/2002 | Corman | 427/295 |
| 6,503,441 B2 * | 1/2003 | Corman et al. | 264/635 |
| 6,627,019 B2 * | 9/2003 | Jarmon et al. | 156/89.11 |
| 7,600,979 B2 * | 10/2009 | Steibel | C04B 35/573 |
| | | | 416/229 A |
| 7,837,914 B2 * | 11/2010 | Kostar et al. | 264/136 |
| 7,926,182 B2 | 4/2011 | Hou | |
| 8,663,778 B2 * | 3/2014 | Kostar et al. | 428/117 |
| 9,050,769 B2 * | 6/2015 | Monaghan | F01D 5/282 |
| 2002/0180120 A1 * | 12/2002 | Corman et al. | 264/632 |
| 2003/0059577 A1 | 3/2003 | Morrison et al. | |
| 2003/0129375 A1 | 7/2003 | Bauer et al. | |
| 2004/0067316 A1 | 4/2004 | Gray et al. | |
| 2005/0056020 A1 | 3/2005 | Hadder | |
| 2005/0118392 A1 | 6/2005 | Millard et al. | |
| 2006/0283014 A1 | 12/2006 | Subramanian et al. | |
| 2007/0096371 A1 * | 5/2007 | McGuigan et al. | 264/640 |
| 2008/0124512 A1 * | 5/2008 | Steibel et al. | 428/105 |
| 2008/0132398 A1 * | 6/2008 | Kostar et al. | 501/1 |
| 2008/0199661 A1 | 8/2008 | Keller et al. | |
| 2009/0324878 A1 * | 12/2009 | Steibel et al. | 428/113 |
| 2010/0255235 A1 | 10/2010 | Ilzhoefer et al. | |
| 2010/0279845 A1 | 11/2010 | Kebbede et al. | |
| 2011/0027525 A1 * | 2/2011 | Kostar et al. | 428/114 |
| 2013/0011271 A1 * | 1/2013 | Shi | F01D 5/28 |
| | | | 416/230 |
| 2013/0017094 A1 | 1/2013 | Coupe et al. | |
| 2013/0017409 A1 | 1/2013 | Schoenecker et al. | |
| 2013/0171426 A1 * | 7/2013 | de Diego et al. | 428/182 |
| 2014/0072736 A1 * | 3/2014 | Gray et al. | 428/34.4 |
| 2016/0101561 A1 * | 4/2016 | Walston | B32B 1/08 |
| | | | 428/34.6 |
| 2016/0115086 A1 | 4/2016 | Tuertscher et al. | |
| 2016/0229755 A1 * | 8/2016 | Luthra | C04B 35/80 |
| 2016/0333698 A1 * | 11/2016 | Weaver | C04B 35/83 |
| 2017/0298745 A1 * | 10/2017 | Freeman | F01D 5/282 |

FOREIGN PATENT DOCUMENTS

| | | |
|---|---|---|
| CN | 102527601 A | 7/2012 |
| CN | 102741043 A | 10/2012 |
| EP | 0240190 A2 | 10/1987 |
| EP | 1262468 A1 | 12/2002 |
| EP | 2578553 A2 | 4/2013 |
| EP | 2617695 A2 | 7/2013 |
| JP | 62227603 A | 10/1987 |
| JP | 62256605 A | 11/1987 |
| JP | 01198343 A | 8/1989 |
| JP | 07195147 A | 8/1995 |
| JP | 2011504823 A | 2/2011 |

OTHER PUBLICATIONS

EP Search Report and Opinion dated Sep. 13, 2013 from corresponding EP Application No. 13165241.4.

Unofficial English translation of Chinese Office Action issued in connection with corresponding CN Application No. 201310149114.8. dated Nov. 4, 2015.

PCT Search Report and Written Opinion issued in connection with related PCT Application No. PCT/US2014/035088 dated Jul. 7, 2014.

Unofficial English Translation of Chinese Office Action issued in connection with related CN Application No. 201480030986.5 dated May 6, 2016.

U.S. Final Office Action issued in connection with corresponding U.S. Appl. No. 13/780,306 dated Jun. 16, 2016.

Unofficial English Translation of Japanese Office Action issued in connection with corresponding JP Application No. 2013089882 dated Jun. 6, 2017.

Unofficial English Translation of Japanese Office Action issued in connection with corresponding JP Application No. 2013089883 dated Jul. 4, 2017.

* cited by examiner

METHOD OF PRODUCING AN INTERNAL CAVITY IN A CERAMIC MATRIX COMPOSITE

CROSS REFERENCE TO RELATED APPLICATIONS

This application claims the benefit of U.S. Provisional Application No. 61/639,617, filed Apr. 27, 2012, the contents of which are incorporated herein by reference.

STATEMENT REGARDING FEDERALLY SPONSORED RESEARCH

This invention was made with government support under Contract No. DE-FC26-05NT42643 awarded by Department of Energy. The Government has certain rights in this invention.

BACKGROUND OF THE INVENTION

The present invention generally relates to ceramic matrix composite (CMC) articles and processes for their production.

CMC materials have become of particular interest for use in turbomachinery as higher operating temperatures are sought to increase their efficiency. CMC materials, and particularly those proposed for gas turbine engine applications, typically comprise a ceramic fiber reinforcement material embedded in a ceramic matrix material. The reinforcement material serves as the load-bearing constituent of the CMC, and the ceramic matrix protects the reinforcement material, maintains the orientation of its fibers, and serves to dissipate loads to the reinforcement material.

Of particular interest to high-temperature applications are silicon-based composites, such as silicon carbide (SiC) as the matrix and/or reinforcement material. Notable examples of SiC/Si—SiC (fiber/matrix) CMC materials and processes are disclosed in commonly-assigned U.S. Pat. Nos. 5,015,540, 5,330,854, 5,336,350, 5,628,938, 6,024,898, 6,258,737, 6,403,158, and 6,503,441, and commonly-assigned U.S. Patent Application Publication No. 2004/0067316. One such process is known as "prepreg" melt-infiltration (MI), which in general terms entails the fabrication of CMCs using multiple prepreg layers, each in the form of a tape-like structure comprising the desired reinforcement material, a precursor of the CMC matrix material, binders, and other possible ingredients. The prepregs must undergo processing (including curing, also known as firing) to convert the precursor to the desired ceramic. Multiple plies of prepregs are stacked and debulked to form a laminate preform, a process referred to as "lay-up." Following lay-up, the laminate preform will typically undergo debulking and curing while subjected to applied pressure and an elevated temperature, such as in an autoclave. The melt-infiltration process generally entails heating the laminate preform in a vacuum or an inert atmosphere to decompose (burnout) the binders and produce a porous preform ready for melt infiltration, after which the preform can be melt infiltrated with, for example, molten silicon supplied externally to the preform. The molten silicon infiltrates into the porosity and preferably reacts with constituents (for example, a carbon source) within the matrix to form a silicon-based ceramic (for example, silicon carbide) that fills the porosity to yield the desired CMC component.

CMC articles having inner cavities are desirable or necessary for some applications, including but not limited to cavities that define cooling slots/holes and complex cooling passages within airfoil components, as well as cavities intended to generally achieve weight reduction. Inner cavities can be produced in a CMC article by forming the laminate preform around a mandrel. However, the mandrels must be removed prior to melt infiltration. Mandrels that remain solid during burnout must be physically removed, which can be impossible if the desired cavity has twists or tapers. FIG. 1 schematically shows an example where a conventional steel mandrel 30 is intended to form a subsequent cavity in a section 20 of a laminate preform 10. The steel mandrel 30 cannot be removed from the preform 10 due to its being captured by a shoulder 22 defined by plies at one end of the preform 10. To address this issue, polymeric mandrels have been proposed that are formed of fugitive resins. Fugitive polymeric resins, in the context of this description, are typically hydro-carbon based solids which upon heating to a sufficiently high temperature, typically 400-800° C., volatilize leaving little or no carbon residue. Notable examples of fugitive resins include polymethyl methacrylate and ply-vinyl alcohol. However, these resins have thermal expansion coefficients that may be five to ten times greater than the material of the CMC preform. The higher expansion coefficient of the fugitive resins can cause the CMC preform to distort during heating to decompose the binder resins. During burnout, the fugitive resins melt and the molten resin must be removed from the resultant cavity within the interior of the CMC article. Some of the molten resin may form a carbonaceous coating inside the cavity which, when reacted with silicon during subsequent melt infiltration, can alter the cavity dimensions. When using fugitive resins with larger-size CMC components, the amount of gases which must escape from or through the preform as the polymeric mandrel decomposes also increases. This necessitates using slower pyrolysis cycles which increases processing cycle time for the CMC components.

Accordingly, there is a need for improved methods capable of forming internal cavities within CMC articles.

BRIEF DESCRIPTION OF THE INVENTION

The present invention provides a method capable of forming an internal cavity within a CMC article through the use of a fusible mandrel.\

A first aspect of the invention is a method of creating an internal cavity in a CMC article by the use of a mandrel to achieve a cavity in a CMC article. The mandrel material melts during a thermal treatment of the CMC preform, and the resulting molten material does not wet or react with constituents of the CMC preform and is drained off leaving behind an internal cavity. In a preferred embodiment of the invention a fusible mandrel is made of elemental tin or a tin alloy and the mandrel is allowed to melt and drain from the preform during the burnout operation of the CMC preform leaving behind a hollow internal within the CMC preform.

A second aspect of the invention is to create a CMC article with a desired internal cavity through a method of using a mandrel made of a material which melts during the burn-out process of the CMC preform. The resulting molten material does not wet and does not react with any constituents of the CMC preform and is drained off leaving behind an internal cavity in the CMC preform which is then melt-infiltrated forming a CMC article with an internal cavity.

A technical effect of the invention is that an internal cavity in a CMC article can be produced without undesired distortion or deformation of a CMC preform used to produce the article. Further, the long processing times typically needed when fugitive polymers are used for producing a cavity can be eliminated.

Another technical effect of the invention is that cavities of desired and complex shapes can be achieved in a CMC article for purposes of weight reduction and/or cooling purposes without difficulties typically associated with the removal of conventional metallic mandrels or the problems associated with elimination of fugitive resins used in non-reactive mandrels.

Other aspects and advantages of this invention will be further appreciated from the following detailed description.

DETAILED DESCRIPTION OF THE INVENTION

This invention is directed to the creation of internal cavities within CMC articles, for example, to create cooling channels, achieve weight reduction and/or any other desired purpose. Conventional processes of creating such cavities have utilized mandrels formed of materials such as fugitive resins or non-reactive metals. Both of these methods have several limitations and disadvantages as described previously. The current invention addresses difficulties and disadvantages of the prior art by methods that utilize mandrels made of fusible materials that can be molten and drained off during the burnout process of the CMC preforms and prior to the melt-infiltration stage in the manufacture of a CMC article. In particular, preferred materials for mandrels employed with the invention are molten at a thermal treatment temperature of the preform, for example, during the curing (firing) step carried out on a laminate preform to form a porous preform.

Preferred characteristics for materials for mandrels that can be advantageously eliminated from a CMC preform include non-wetting of the CMC preform, low or no reactivity with the constituents of the CMC preform, and being completely fusible and drainable at a temperature of a thermal treatment performed on the CMC preform. In preferred embodiments of the invention a fusible mandrel comprises or consists of elemental tin or a tin alloy. Such a mandrel can be cast into the shape of the desired inner cavity and incorporated into the CMC preform. This mandrel, made of such a low melting metal or alloy as tin or its alloys, can melt and be allowed to drain from the preform during the burnout operation of the CMC preform leaving a hollow cavity in the CMC preform.

A mandrel of this invention many be formed entirely of elemental tin or an alloy of tin. Mandrels of this invention can be cast into the desired shapes for the inner cavities of a CMC article and prepreg tapes can be directly laid up on the mandrels. The low-melting tin or alloy melts during the burn-out stage of the CMC preform and is allowed to drain from the preform leaving behind a hollow cavity of the desired shape. Tin and its alloys have been demonstrated to possess the desired characteristics of a fusible material that is non-wetting and non-reactive with CMC preforms. Furthermore, mandrels made of such fusible and recoverable materials can be removed during the burnout processes without the thermal expansion issues generally associated with using fugitive polymers as mandrel materials.

Figure 3:
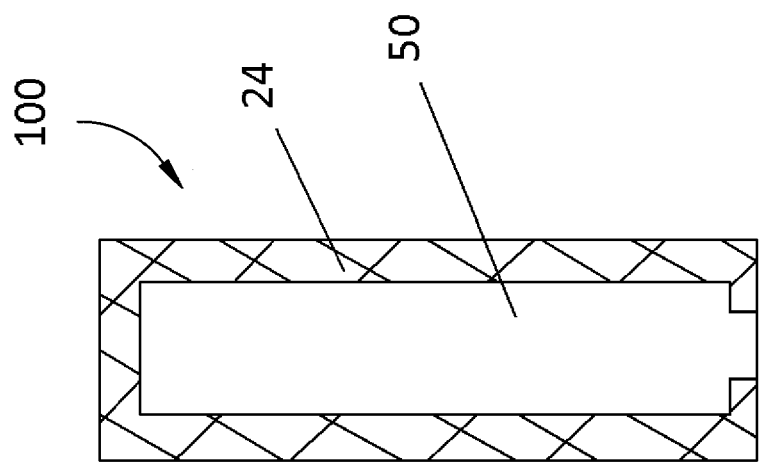
FIG. 3 schematically represents a cross section of a CMC article with a cavity achieved through the draining and recovery of a mandrel made of a fusible material which is non-wetting and non-reactive to the constituents of the CMC preform from which the article was formed.
Figure 2:
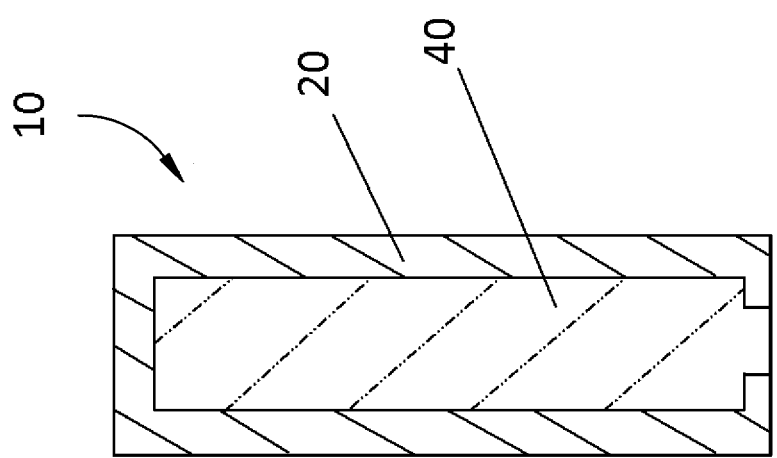
FIG. 2 schematically represents a cross-section of a CMC preform with a mandrel made of a fusible material which is non-wetting and non-reactive to the constituents of the CMC preform.
Figure 1:
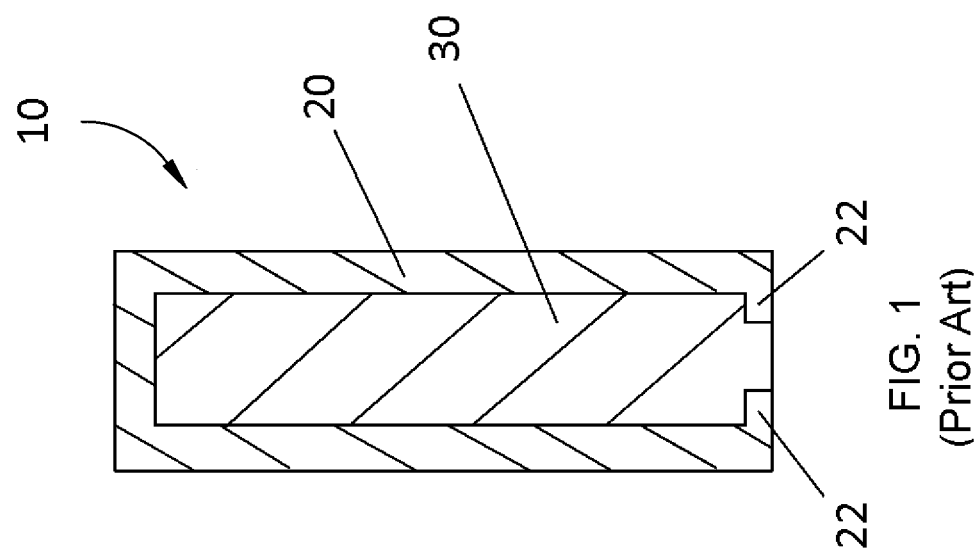
FIG. 1 schematically represents a cross-section of a CMC preform with a conventional metallic mandrel.

As tin or tin alloy used for the mandrel is solid when incorporated into the CMC preform and is subsequently molten while being non-wetting and non-reactive with the CMC preform, the dimensions of an inner cavity that is subsequently formed substantially match the dimensions of the fusible mandrel. FIG. 2 schematically represents a cross section of a fusible mandrel 40 incorporated into a section 20 of a laminate preform 10. During the CMC preform burnout process, the fusible mandrel made of tin or tin alloy melts, does not wet or react with the constituents of the CMC preform 10, and is drained away from the CMC preform 10. In a subsequent operation, for example, melt infiltration, a CMC article can be formed from the preform 10. FIG. 3 schematically represents a cavity 50 formed in the section 20 of the fully infiltrated CMC preform 10, indicated in FIG. 3 as the final CMC article 100. It is possible that tin oxide may form during the burn-out process when the fusible mandrel melts; however, any tin oxide formed will completely evaporate at the subsequent processes used to form the CMC article such as, for example, melt infiltration.

In some processes of forming CMC articles based on silicon compounds, such as, for example, SiC, melt-infiltration may be used utilizing molten silicon as an infiltrant. In such cases, after an internal cavity is formed in a CMC preform, ingress of the infiltrant into the internal cavity during melt infiltration can be prevented or at least inhibited by coating the surface of the internal cavity with a slurry comprising a powder of a ceramic material that is not wettable or at least exhibits low wettability to the infiltrant, for example, boron nitride (BN) if the infiltrant is silicon. The boron nitride slurry can be water-based and a drying step can be used to achieve the coating. Particles of the powder of the ceramic material should be large enough not to go through the openings in the porous preform and small enough to be made into a slurry which can result in uniform coating. The preform openings are typically in the range of 0.1-0.2 micrometer. Accordingly, a preferred average particle size of a boron nitride powder used in a slurry to effect a ceramic coating for the internal cavity when the infiltrant is silicon is about 0.5-1.0 micrometer. This coating advantageously prevents the surfaces of the internal cavity from being wet by the infiltrant during a melt-infiltration step in forming the CMC article, and hence prevents the formation of silicon in the internal cavities of the CMC article.

It is foreseeable that other fusible materials could be used that do not wet the CMC preform or react with the CMC preform during the burn-out process and are completely removable at the CMC preform burn-out temperatures. The preferred embodiment of the invention is thus utilization of any low-melting material such that no materials are formed other than those intended to be created in conventional CMC manufacturing processes, such as melt-infiltration processes that form, for example, SiC. Another feature of this invention is that a fusible material which can be melted during a thermal treatment of the a CMC preform and drained off to form an internal cavity in a laminate preform can be recycled to form another mandrel for use to form an internal cavity in another CMC article. Thus the invention can be described as a method of forming an internal cavity in a CMC preform or a final CMC article using recyclable mandrels.

In view of the above, it can be seen that a significant advantage of this invention is that it solves problems associated with forming hollow internal cavities within CMC articles without having to physically remove a mandrel from the resulting inner cavity after curing the CMC preform, and without introducing potentially deleterious materials into the final CMC article.

Multiple cavities can be formed in a CMC preform utilizing multiple mandrels and following the methods described herein. A single cavity or multiple cavities formed in a CMC article can be utilized for purposes of weight reduction, and/or as cooling slot/hole or slots/holes.

While the invention has been described in terms of specific embodiments, it is apparent that other forms could be adopted by one skilled in the art. Accordingly, it should be understood that the invention is not limited to the specific disclosed embodiments. It should also be understood that the phraseology and terminology employed above are for the purpose of disclosing the invention and the embodiments, and do not necessarily serve as limitations to the scope of the invention. Therefore, the scope of the invention is to be limited only by the following claims.

The invention claimed is:

1. A method of forming a CMC article to have at least one internal cavity, the method comprising:
   incorporating at least one mandrel into a CMC preform via laying the CMC preform on the at least one mandrel, wherein the CMC preform comprises multiple prepreg layers in the form of a tape-like structure comprising a reinforcement material, a precursor of a CMC matrix material, and binders, wherein the at least one internal cavity comprises multiple cavities and the at least one mandrel comprises multiple mandrels; and
   subjecting the CMC preform to a thermal treatment wherein the at least one mandrel melts to form a molten material that drains from the CMC preform to leave behind at least one internal cavity within the CMC preform.

2. The method according to claim 1, wherein the mandrel consists of tin or a tin alloy.

3. The method according to claim 1, wherein the thermal treatment is a burn-out process.

4. The method according to claim 1, wherein the at least one mandrel is free of materials that are wetting and/or reactive to constituents of the CMC preform.

5. The method according to claim 1, the method further comprising recovering the molten material and forming another mandrel from the molten material.

6. The method according to claim 1, the method further comprising coating the at least one internal cavity with a slurry comprising a ceramic material.

7. The method according to claim 6, wherein the ceramic material is boron nitride.

8. The method according to claim 7, wherein the average particle size of boron nitride is about 0.5 to 1.0 micrometer.

9. A method of forming a CMC article to have at least one internal cavity, the method comprising:
   incorporating at least one mandrel into a CMC preform via laying the CMC preform on the at least one mandrel, wherein the CMC preform comprises multiple prepreg layers in the form of a tape-like structure comprising a reinforcement material, a precursor of a CMC matrix material, and binders, the at least one mandrel consisting of a material that is non-wetting and non-reactive with any constituents of the CMC preform, wherein the at least one internal cavity comprises multiple cavities and the at least one mandrel comprises multiple mandrels;
   subjecting the CMC preform to a burn-out process wherein the at least one mandrel melts to form a molten material that does not wet the CMC preform, does not react with constituents of the CMC preform, and drains from the CMC preform to leave behind at least one internal cavity in the CMC preform; and
   melt-infiltrating the CMC preform with an infiltrant to form the CMC article which has the at least one internal cavity.

10. The method of claim 9, wherein the material of the at least one mandrel is elemental tin.

11. The method of claim 9, wherein the material of the at least one mandrel is a tin alloy.

12. The method of claim 9, the method further comprising coating the at least one internal cavity with a slurry of a ceramic material prior to the melt infiltration step, the ceramic material not being wettable by the infiltrant.

13. The method of claim 12, wherein the ceramic material is boron nitride.

14. The method of claim 13, wherein the average particle size of boron nitride is about 0.5 to 1.0 micrometer.

15. The method of claim 9, wherein the at least one internal cavity is a cooling slot or hole.

16. The method of claim 9, wherein the CMC article is an airfoil component.

17. The method of claim 9, wherein the CMC article is based on at least one silicon compound.

18. The method of claim 17, wherein the infiltrant is silicon and the at least one silicon compound is SiC.

19. The method of claim 1, wherein the CMC perform in the incorporating step is uncured and is laid on a surface of the at least one mandrel.

* * * * *